United States Patent Office

3,845,152
Patented Oct. 29, 1974

3,845,152
SELECTIVE ISOMERIZATION OF POLYENES HAVING TERMINAL CONJUGATED UNSATURATION
James Michael McKenna, Hockessin, Del., assignor to E. I. du Pont de Nemours and Company, Wilmington, Del.
No Drawing. Filed Mar. 29, 1972, Ser. No. 239,323
Int. Cl. C07c 5/24
U.S. Cl. 260—677 R                12 Claims

ABSTRACT OF THE DISCLOSURE

Polyenes with terminal conjugated unsaturation are selectively isomerized, shifting the terminal conjugation to an internal position, by contacting the polyene with a catalyst prepared by mixing a cobalt (II) salt and a Group IA or IIA cyanide and exposing the mixture to hydrogen. Isomerization is conducted in a solvent and at a temperature of 25 to 150° C. A preferred embodiment is the isomerization of 1,3,7-octatriene to 1,4,6-octatriene utilizing a catalyst prepared in situ by mixing cobalt chloride and a Group IA cyanide under a hydrogen atmosphere.

BACKGROUND OF THE INVENTION

The isomerization of organic compounds is well known in the art. An effective method is not known, however, for the selective isomerization of polyenes having terminal conjugated unsaturation whereby the terminal conjugated unsaturation is shifted by one carbon atom to an internal position without subsequent isomerization to undesired by-products.

It is also well known to dimerize butadiene to form octatrienes. The various dimerization processes will yield among other products, 1,3,7-octatriene and 1,3,6-octatriene, but will not directly yield certain octatriene isomers such as 1,4,6-octatriene. Various catalyst systems have been suggested for isomerization of these octatrienes, such as the use of tetrahydrocarbylammonium hydroxides in aprotic polar solvents to isomerize 1,3,7- and 1,3,6-octatrienes to 2,4,6-octatriene. This entirely conjugated triene is usually the main product formed when 1,3,7-octatriene is isomerized by known catalysts.

SUMMARY OF THE INVENTION

Terminal conjugated unsaturation of a polyene is selectively isomerized to an internal position by contacting the polyene, in a solvent, with a catalyst prepared by admixing a cobalt (II) salt and a Group IA or IIA cyanide and exposing the mixture to hydrogen. This selective isomerization process shifts the terminal conjugated unsaturation one carbon atom to the interior of the carbon chain, with the polyene structure being otherwise unaffected.

The polyenes which undergo selective isomerization in accordance with this invention have terminal conjugated unsaturation in a carbon chain of at least six carbon atoms. A preferred embodiment is the isomerization of 1,3,7-octatriene to 1,4,6-octatriene.

DESCRIPTION OF THE PREFERRED EMBODIMENT

The polyene compounds which are selectively isomerized in accordance with this invention have a linear backbone of at least six carbon atoms and have terminal conjugated unsaturation. The polyenes can have pendant alkyl groups. When alkyl groups are present on both carbon atoms sharing a double bond, however, the rate of selective isomerization may be significantly decreased. The polyene can generally have pendant substituents such as aryl, hydroxyl, carbonyl, ester, amino, and amide groups provided that a substituent is not on or next to a carbon double bond which is undergoing selective isomerization. The polyene generally does not have aliphatic halogen substitution as such substitution can cause undesired side reactions.

Representative dienes which undergo selective isomerization in practicing this invention include 1,3-heptadiene, 1,3-octadiene, 1,3-nonadiene, 1,3-decadiene, 2-methyl-1,3-heptadiene, 2-methyl-1,3-octadiene, 3-methyl-1,3-heptadiene, 5-methyl-1,3-nonadiene, 6-methyl-1,3-octadiene, and 6-methyl-1,3-nonadiene. Representative trienes which likewise undergo selective isomerization include 1,3,6-octatriene, 1,3,6-nonatriene, 1,3,7-nonatriene, 1,3,7-octatriene, 1,3,6-decantriene, 1,3,7-decatriene, 1,3,8-decatriene, 1,3,9-decatriene, 1,3,8-nonatriene, and 2-methyl-1,3,6-octatriene. Representative tetraenes include 1,3,7,9-undecatetraene and 1,3,8,10-undecatetraene.

Selective isomerization is accomplished by contacting the polyene, in a solvent, with a catalyst prepared by mixing a cobalt (II) salt and a Group IA or IIA cyanide and exposing the mixture to hydrogen. A Lewis Acid can be optionally added to the isomerization mixture to inhibit anionic side-reactions if the particular polyene-solvent-catalyst system selected for use exhibits such a tendency.

Solvents which can be used in conducting the selective isomerization include any solvent which will dissolve both the polyene and catalyst and which will not react with or promote reaction of the polyene or catalyst to any appreciable degree. The solvent must be polar in order to dissolve the catalyst. Water alone cannot be used as it causes partial hydrogenation of the polyene unsaturation. The solvent can, however, contain up to about 10% water without causing excessive partial hydrogenation. The solvent will normally contain about 1–5% water. This water is introduced as water of hydration associated with the catalyst salts and does not appreciably effect selective isomerization yields.

Other solvents with an active hydrogen will show an increasing tendency to cause partial hydrogenation of the polyene as the reactivity of the active hydrogen increases. Selection of the particular solvent will vary with the tendency of the selected polyene to undergo partial hydrogenation at the selected isomerization temperature and pressure and with the degree to which partial hydrogenation can be tolerated.

Representative solvents which can be selected in practicing this invention are methanol, ethanol, glycerol, ethylene glycol, 1,5-pentanediol, acetonitrile, DMF, pyridine, tetramethylenesulfone, and DMSO. Preferred solvents are $C_1$–$C_4$ alcohols and polyols, tetramethylenesulfone, and DMSO. Especially preferred is DMSO.

The catalyst is prepared by mixing a cobalt (II) salt and a Group IA or IIA cyanide in the solvent and exposing the solution to hydrogen. Exposure to hydrogen will normally be accomplished by subjecting the mixture to a hydrogen atmosphere either during or subsequent to the introduction of cobalt salt and cyanide into the solvent. Other hydrogen sources, such as sodium borohydride, can also be used for this purpose. If sources such as sodium borohydride are selected, the source is added to the solvent before, during, or following introduction of the cobalt salt and cyanide.

The catalyst is conveniently formed in situ in the solvent either before or after introduction of the polyene. The catalyst can also be formed in solvent which is subsequently admixed with dissolved polyene. The exact order of introducing the cobalt (II) salt, cyanide, and hydrogen can vary. Conveniently, the cobalt (II) salt, cyanide, and polyene are mixed in the solvent. The resulting solution is then placed under a hydrogen atmosphere which is the source of hydrogen in forming the catalyst complex.

The cobalt (II) salt can be any salt which will dissolve in the selected solvent to yield cobalt (II) ions for the formation of the catalyst. Representative of such salts, which can be anhydrous or hydrated, are cobalt chloride, cobalt sulfate, cobalt nitrate, cobalt cyanide, and cobalt acetate. Preferred is anhydrous or hydrated cobalt chloride.

The cyanide selected is a Group IA, Group IIA, or cobalt cyanide. Representative of these cyanides are lithium cyanide, sodium cyanide, potassium cyanide, and barium cyanide. The elements included in Group IA and IIA for the purposes of this invention are as identified in the *Handbook of Chemistry and Physics*, 40th Edition (1958), by Chemical Rubber Publishing Company, Cleveland, Ohio, pages 444–445.

In forming the isomerization catalyst the cobalt (II) salt and cyanide compound are introduced in such amounts that at least 3 gram-equivalents of cyanide ion are supplied per gram-atom of cobalt. The preferred range is at least 5 to 1. When the catalyst is formed in situ, addition of the cobalt (II) salt and cyanide can preceed establishment of a hydrogen atmosphere. When the catalyst is formed prior to contact with the polyene solution, the catalyst can be exposed to hydrogen prior to its addition to the polyene solution eliminating the necessity of subjecting the polyene solution to a hydrogen atmosphere. In such a case it is preferred that additional hydrogen be present when the catalyst is being used to isomerize the polyene since more rapid reaction rates and greater catalyst efficiency are obtained thereby.

The selective isomerization gives lower conversions and is more susceptible to side reactions as the cobalt concentration becomes very dilute. While the lower limit of required catalyst concentration will vary with the selected polyene and desired yield, it has generally been found that enough catalyst should be present to supply 0.005 gram-atoms of cobalt per liter of isomerization solution. There is no upper limit of catalyst concentration since selective isomerization occurs when the catalyst is present in amounts exceeding that soluble in the solvent. No beneficial results are obtained, however, in increasing catalyst concentration above about 1.0 gram-atoms of cobalt per liter of isomerization solution. The preferred range is about 0.025 to 0.075 gram-atoms of cobalt per liter.

Certain of the solvent mediums which are useful in practicing this invention have been found to promote anionic side reactions such as dimerization, polymerization, and undesired isomerization. For example, a portion of 1,3,7-octatriene will be dimerized or isomerized to 2,4,6-octatriene rather than being selectively isomerized to 1,4,6-octatriene when DMSO is selected as the solvent.

These competing anionic reactions can be essentially eliminated by the addition of certain Lewis acids to the isomerization solution. Representative Lewis acids which can be used for this purpose are anhydrous or hydrated aluminum chloride, stannic tetrachloride, and boron trifluoride. Aluminum chloride is preferred.

The amounts of Lewis acid that is needed depends on the specific reaction conditions. Excess cyanide ion, higher temperatures, and longer reaction time generally require larger amounts of Lewis acid for optimum results. Under moderate reaction conditions less than an equivalent amount, relative to the cobalt or cyanide ion, can be used. Under mild conditions the Lewis acid can be omitted.

The isomerization will take place at temperatures in the range of about 25 to 150° C. Since the catalysts will generally undergo some decay at temperatures above 100° C., it is generally preferred to conduct the isomerization at temperatures below 100° C. in order to optimize catalyst efficiency. A preferred range is about 50 to 75° C. to optimize both conversion rate and catalyst efficiency.

The selective isomerization can conveniently be conducted at atmospheric pressure. Sub-atmospheric pressure gives somewhat less favorable isomerization rates. Moderate hydrogen pressures, such as 5 p.s.i.a. to several hundred p.s.i.a., can be used to advantage with conversion yields up to about 95%. Extremely high pressures, such as 10,000 p.s.i., give lower yields as hydrogenation of the polyene becomes an important competing reaction.

Both batch and continuous process methods can be used, but batch methods are preferred. The isomerized polyene can be isolated from the isomerization solution by distillation and by other methods known in the art.

The process of this invention produces polyenes in which the position of terminal conjugated double bonds have been shifted one carbon atoms to the interior of the polyene chain. The unsaturation so shifted remains conjugated. Such polyenes have utility for the production of homopolymers and copolymers. Preferred polyene products which have terminal unsaturation in addition to isomerized internal conjugation, such as 1,4,6-octatriene, have special utility as a comonomer in the polymerization of ethylene and α-olefins.

The polyene 1,4,6-octatriene will copolymerize with ethylene and α-olefins at the terminal double bond, resulting in a copolymer having side chains containing conjugated unsaturation. This side chain unsaturation is readily available for Diels-Alder curing with a dienophile as well as conventional elastomer curing methods.

The invention can be further illustrated by the following examples. In Examples 1 and 2 1,3,7-octatriene was contaminated with 4-vinylcyclohene which is a by-product of the dimerization of butadiene. This by-product can be removed from 1,3,7-octatriene prior to selective isomerization if so desired.

Example 1

A 500 ml. pressure bottle is charged with 0.72 grams of $CoCl_2 \cdot 6H_2O$, 0.98 grams of KCN, 8 ml. of 1,3,7-octatriene (contaminated with 31% by weight of 4-vinylcyclohexene), and 12 ml. of dimethylsulfoxide. The bottle is evacuated and then hydrogen is introduced until an absolute pressure of 35 p.s.i. is obtained. The bottle is then heated to 60° C. and agitated for 16 hours at 60° C. in a shaker apparatus.

The reaction mixture is then cooled to room temperature, depressurized, diluted with pentane, and shaken. The pentane layer is separated, and the sulfoxide solution is extracted two more times with pentane. After the combined pentane extracts have been washed with water, the pentane is removed in a rotary evaporator leaving about 6 ml. of a colorless product.

This product is analyzed by gas chromatography with the following results:

| | Percent |
|---|---|
| 4 vinylcyclohexene (unchanged) | 31 |
| 1,4,6-octatriene | 61 |
| 1,3,7-octatriene | 5 |
| Octadienes | 3 |
| Other octatrienes | 0.5 |

The octadienes and 4-vinylcyclohexene are removed from the product by an azeotropic distillation with acetonitrile and the unreacted 1,3,7-octatriene starting material is removed by distillation.

The remaining product is identified as 1,4,6-octatriene by its physical properties. The boiling point of 50° C. at 30 mm. and gas chromotographic retention times are characteristic of an eight carbon atom hydrocarbon. The ultraviolet spectrum shows a single peak at 2280A, E=24,800, indicative of an internal conjugated diene. The infrared spectrum shows a very strong absorption at 10.1μ and a weaker absorption at 10.9μ, indicating the presence of *trans* double bonds and terminal double bond. The NMR spectrum shows 7 olefinic protons, 2 of which are in a pattern characteristic of a $=CH_2$ group, 2 doubly allylic protons at 2.728, and 3 singly allylic methyl protons at 1.708. These properties are uniquely consistent with 1,4,6-octatriene.

Example 2

A 500 ml. pressure bottle is charged with 0.72 grams of $CoCl_2 \cdot 6H_2O$, 0.99 grams of KCN, 0.40 grams of $AlCl_3$, 5 ml. of 1,3,7-octatriene (contaminated with 32% by weight of 4-vinylcyclohexene, and 10 ml. of dimethylsulfoxide. The bottle is evacuated and then hydrogen is introduced until an absolute pressure of 35 p.s.i. is obtained. The bottle is then heated to 60° C. and agitated for 16 hours at 60° C. in a shaker apparatus.

The reaction mixture is then cooled to room temperature, depressurized, diluted with pentane, and shaken. The pentane layer is separated, and the sulfoxide solution is extracted two more times with pentane. After washing the combined pentane extracts and removing the pentane as in Example 1, 3 ml. of colorless product are obtained.

This product is analyzed by gas chromatography with the following results:

|  | Percent |
| --- | --- |
| 4-vinylcyclohexene (unchanged) | 32 |
| 1,4,6-octatriene | 37 |
| 1,3,7-octatriene | 30 |
| Octadienes | 0.5 |
| Other octatrienes | 0.5 |

The procedure of this example is repeated using lower concentrations of polyene, resulting in 95% conversion of 1,3,7-octatriene to 1,4,6-octatriene. The Lewis acid inhibits anionic reactions without significantly affecting the selective isomerization yield.

Example 3

A 500 ml. pressure bottle is charged with 0.72 grams of $CoCl_2 \cdot 6H_2O$, 3.0 grams of KCN, 1.44 grams of $AlCl_3 \cdot 6H_2O$, 3 ml. of 1,3-hexadiene, and 40 ml. of dimethyl sulfoxide.

The bottle is then evacuated and pressured with hydrogen to 35 p.s.i.a. The bottle is heated to 65° C., and the contents are shaken for 15 hours while maintaining the temperature at 65° C. Thereafter, the bottle and contents are cooled to 25° C. and the bottle is depressurized.

The contents of the pressure bottle are transferred to a rotary evaporator. The volatile fraction, which contains 2,4-hexadiene, is collected in a cold trap and washed with water. One milliliter of colorless product is obtained.

The NMR spectrum of this product shows 4 olefinic protons, none of which resemble protons in a $=CH_2$ group, and 6 singly allylic methyl protons. Spectrum data is consistent with the structure of 2,4-hexadiene. Gas chromatographic analysis of the product shows that it is 98% pure.

I claim:

1. A process for the selective isomerization of a terminally conjugated polyene having a carbon chain of at least six carbon atoms, whereby terminal conjugated unsaturation is shifted to an internal position, the process comprising contacting the polyene with a catalyst consisting essentially of a hydrogen-exposed mixture of (a) a cobalt (II) salt, (b) at least one of Group IA cyanide and a Group IIA cyanide, with the proviso that the ratio of cyanide ion gram-equivalents to cobalt gram-atoms is at least 3 to 1;

the process being carried out in the presence of a solvent containing 0-10% water and at a temperature of about 25-150° C.

2. The process of claim 1 wherein the catalyst is formed in situ.

3. 1,4,6-octatriene.

4. The process of claim 2 wherein the catalyst is present in the amount of at least 0.005 gram-atoms of cobalt per liter of isomerization solution.

5. The process of claim 4 wherein the solvent is at least one of dimethyl sulfoxide, tetramethylenesulfone, or a $C_1$ to $C_4$ alcohol or polyol.

6. The process of claim 5 wherein the ratio of cyanide ions to cobalt atoms is at least 5 to 1.

7. The process of claim 6 wherein a Lewis acid is also present in the isomerization solution.

8. The process of claim 1 wherein the terminally conjugated polyene is 1,3,7-octatriene and the isomerization product is 1,4,6-octatriene.

9. The process of claim 8 wherein the catalyst is present in the amount of about 0.025 to 0.075 gram-atoms of cobalt per liter of isomerization solution.

10. The process of claim 9 wherein the cobalt salt is cobalt chloride and the cyanide is a Group IA cyanide.

11. The process of claim 10 wherein the ratio of cyanide ions to cobalt atoms is at least 5 to 1 and the temperature is about 50 to 75° C.

12. The process of claim 11 wherein a Lewis acid selected from the group of aluminum chloride, stannic tetrachloride, and boron trifluoride is also present in the isomerization solution.

References Cited

UNITED STATES PATENTS

| 3,501,540 | 3/1970 | Zuech | 260—666 |
| 3,285,889 | 11/1966 | Arnold | 260—680.5 |
| 3,522,321 | 7/1970 | DeYoung | 260—666 R |
| 3,449,463 | 6/1969 | Kenton et al. | 266—677 R |
| 3,009,969 | 11/1961 | Spencer et al. | 260—666 R |
| 3,546,310 | 12/1970 | Cardenos | 260—677 |
| 3,678,085 | 7/1972 | Rick et al. | 260—666 B |

OTHER REFERENCES

Kwiatek: "Reactions Catalyzed by Pentacyanocobaltate (II)" Catalysis Review, 1(1), 37–72 (1967).

Arakawa et al.: Journal of The Chemical Society of Japan (Ind. Chemical Sec.), Vol. 74, No. 6, pp. 1143–1149, June 1971.

DELBERT E. GANTZ, Primary Examiner

J. M. NELSON, Assistant Examiner

U.S. Cl. X.R.

260—683.2, 666 B